Dec. 29, 1925.

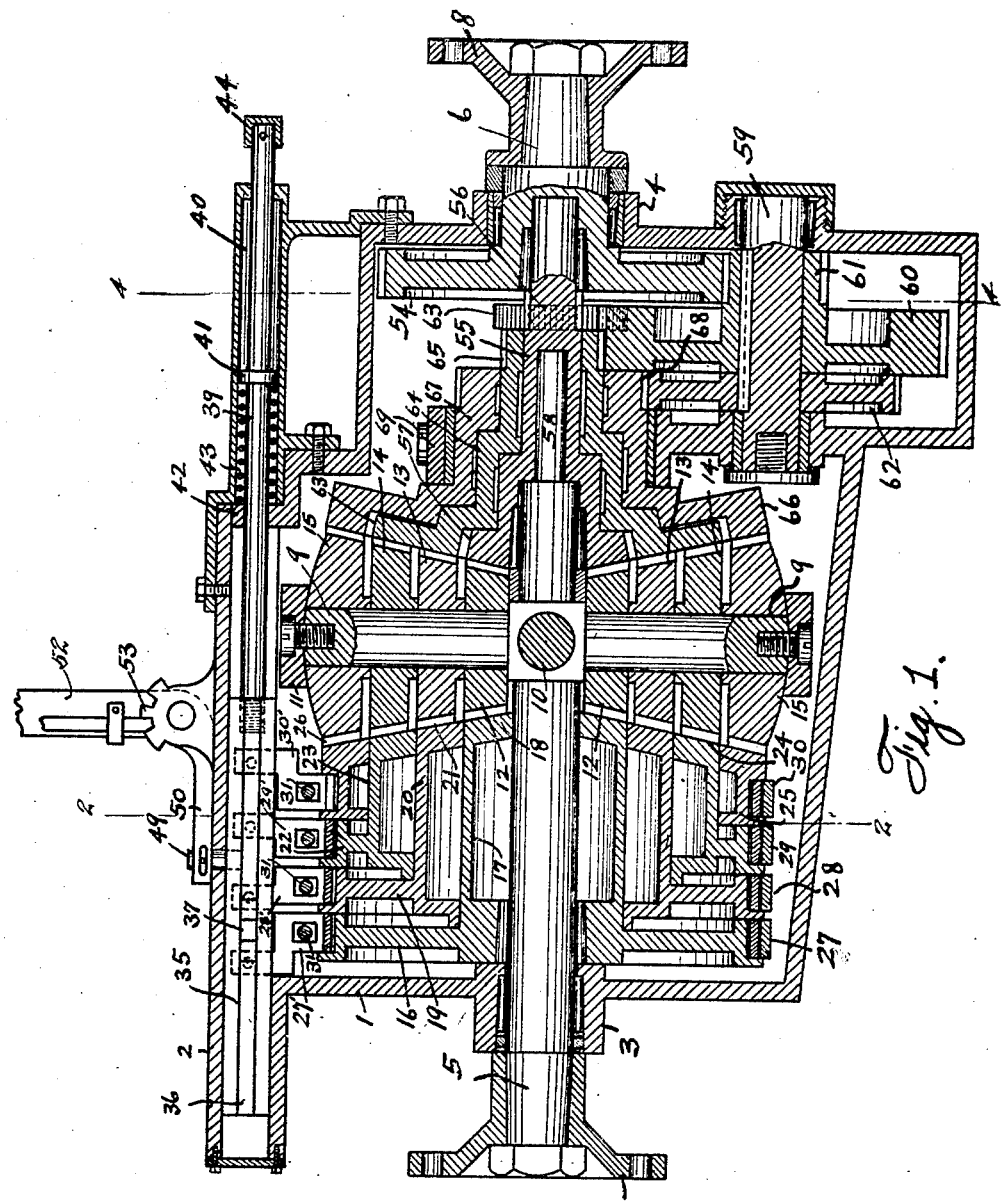

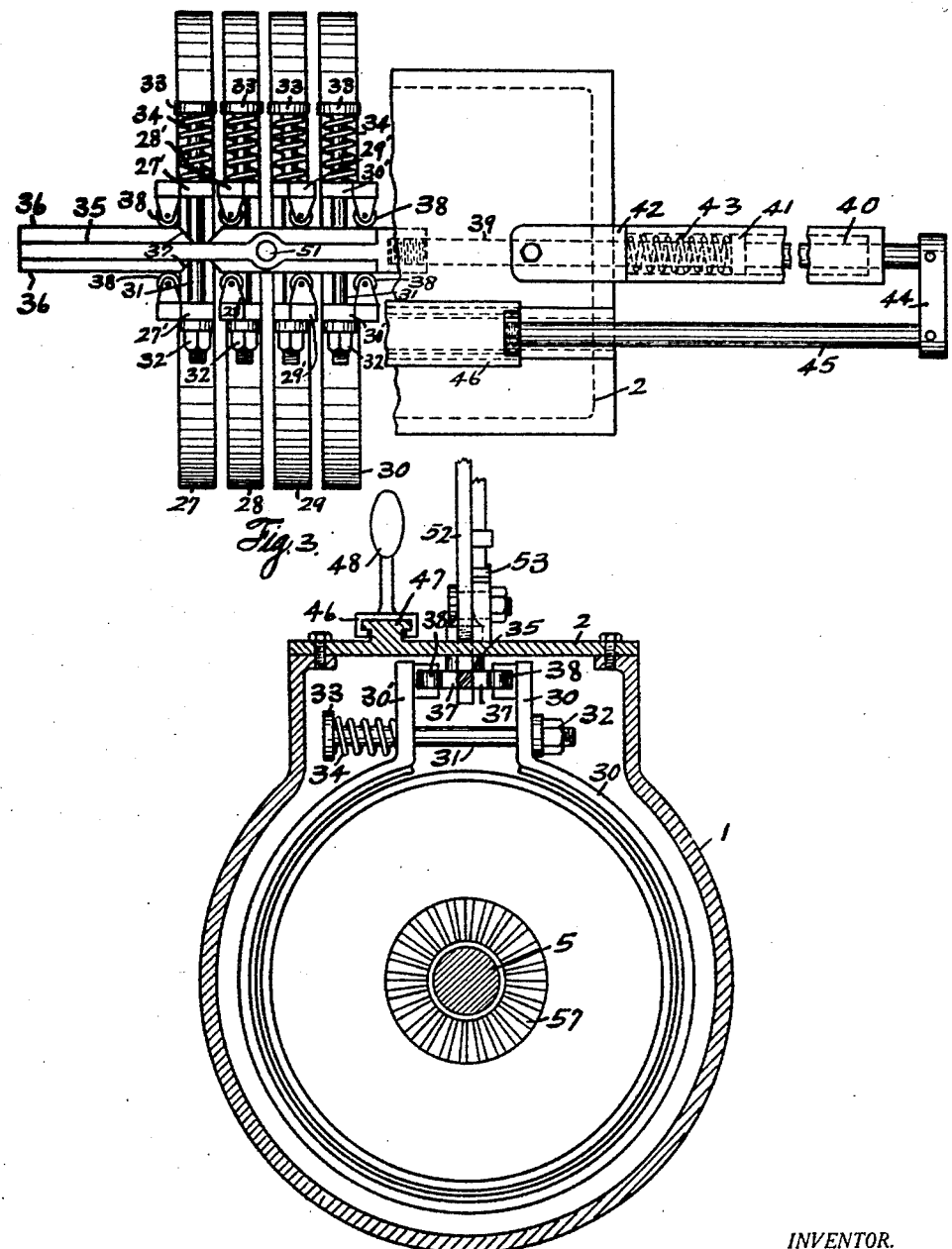

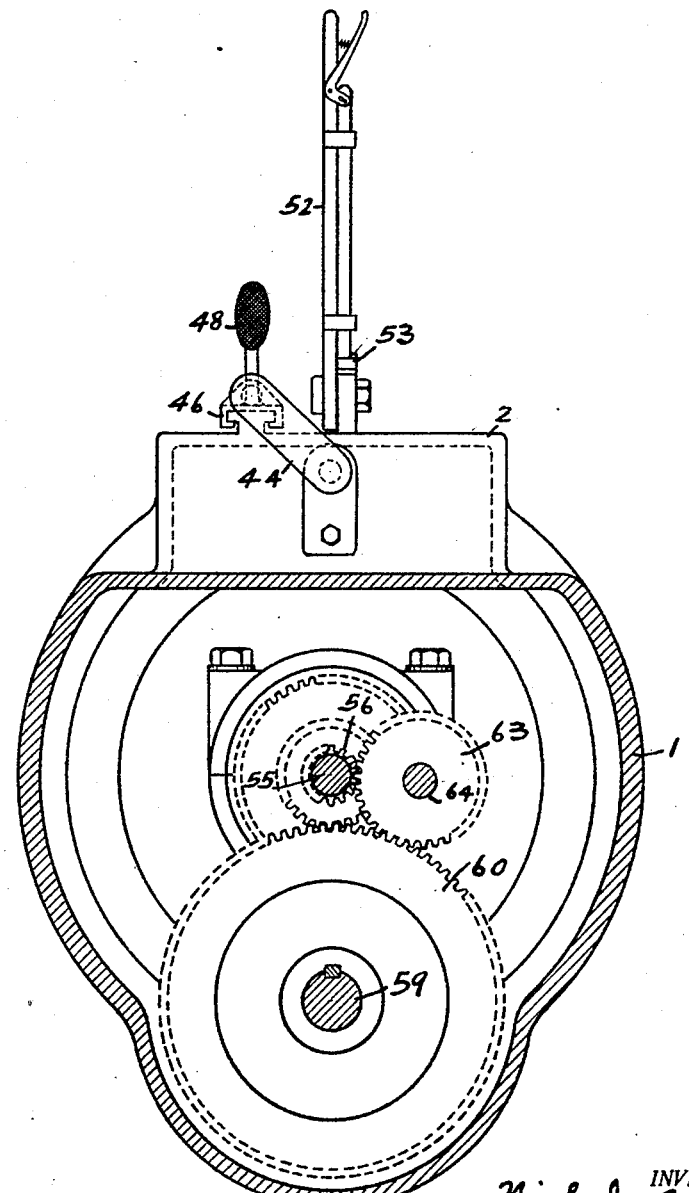

N. G. CEDILLO

TRANSMISSION MECHANISM

Filed August 21, 1922    4 Sheets-Sheet 4

1,567,490

INVENTOR.
Nich. G. Cedillo
BY
Hardway Cathy
ATTORNEYS

Patented Dec. 29, 1925.

1,567,490

UNITED STATES PATENT OFFICE.

NICK G. CEDILLO, OF HOUSTON, TEXAS, ASSIGNOR OF ONE-FOURTH TO E. E. DOWDELL, OF HARRIS COUNTY, TEXAS.

TRANSMISSION MECHANISM.

Application filed August 21, 1922. Serial No. 583,103.

*To all whom it may concern:*

Be it known that I, NICK G. CEDILLO, citizen of the United States, residing at Houston, in the county of Harris and State of Texas, have invented certain new and useful Improvements in Transmission Mechanism, of which the following is a specification.

This invention relates to new and useful improvements in a transmission mechanism.

One object of the invention is to provide a transmission mechanism through which power may be transmitted from a driving to a driven member at various rates of speed, and whereby the speeds may be varied without the necessity of shifting the gears.

Another object of the invention is to provide a transmission through which power may be transmitted from a driving to a driven member rotating in the same or in reverse directions.

A further feature of the invention resides in the provision of a transmission mechanism by means of which a change of speed of the driven member may be readily obtained from any speed to any other speed and through which the direction of rotation of the driven member may be readily reversed.

Another object of the invention resides in the provision of a transmission mechanism which may be readily moved to neutral position so that no power will be transmitted, and which will dispense with the necessity of a clutch and the clutch operating mechanism for connecting the motor to the driving member.

A still further feature of the invention resides in the provision of a transmission mechanism which is of very simple and compact construction and may be cheaply and easily manufactured and easily manipulated.

With the above and other objects in view the invention has particular relation to certain novel features of construction, operation and arrangement of parts, an example of which is given in this specification and illustrated in the accompanying drawings, wherein:

Figure 1 is a longitudinal vertical sectional view.

Figure 2 is a cross sectional view taken on the line 2—2 of Figure 1, with certain parts removed for the sake of clearness.

Figure 3 is a fragmentary plan view.

Figure 4 is a cross sectional view taken on the line 4—4 of Figure 1.

Figure 5:
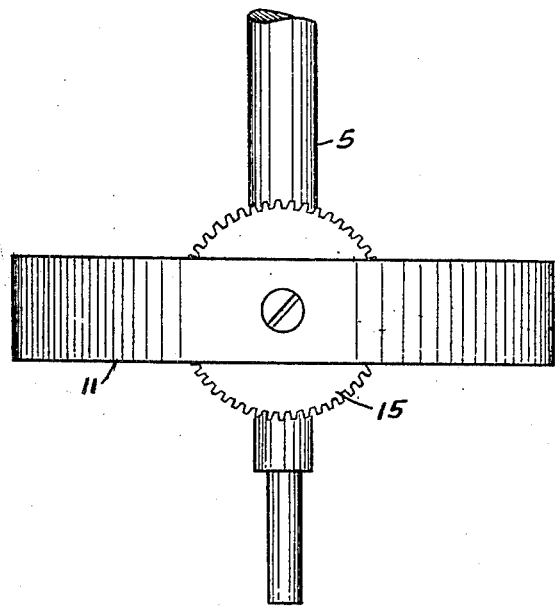
Figure 5 is a plan view of the gear frame.
Figure 6:
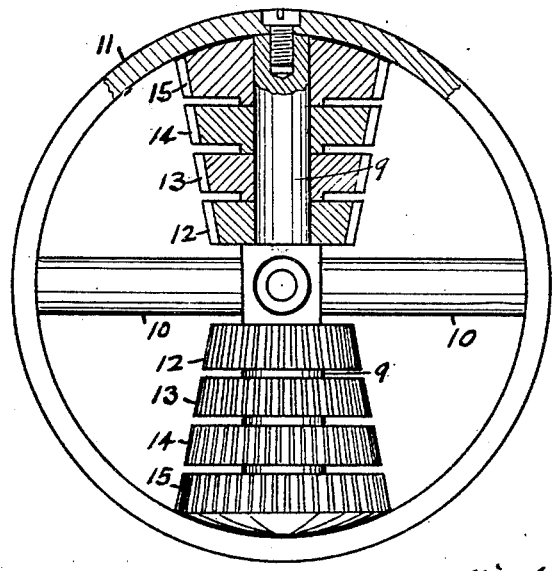
Figure 6 is an elevational view thereof shown partly in section.

In the drawings the numeral 1 designates the transmission case having the cover 2 secured thereon, and formed with the end bearings 3 and 4 in which the driving and driven shafts 5 and 6, respectively rotate. The driving shaft has the flange union 7, by means of which it may be connected to the driving motor, and the driven shaft has a flange 8, by means of which it may be connected to the propeller shaft or other driven mechanism. Fixed upon the driving shaft 5, within the case 1 there is a gear frame consisting of the radiating bearing pins 9, 9, and 10, 10, surrounding which and anchored to the outer ends of said pins is the band 11. Rotatably mounted on the respective pins 9 are the reverse gears 12, 12 and the low, intermediate and high speed gears 13, 13, 14, 14 and 15, 15. At the forward end of the casing there is a reverse drum 16, loosely mounted on the shaft 5 and formed with a sleeve 17 which is formed with a gear face 18 in mesh with the reverse gears 12. Loosely mounted on the sleeve 17 there is a drum 19 formed with a sleeve 20 whose inner end is formed into a gear face 21 in mesh with the low speed gears 13. Loosely mounted on the sleeve 20 there is a drum 22 formed with a sleeve 23 whose inner end is formed with a gear face 24 in mesh with the intermediate gears 14, and loosely mounted on the sleeve 23 there is a drum 25 whose inner end is formed with a gear face 26 in mesh with the high speed gears 15. Surrounding these respective drums are the bands 27, 28, 29 and 30 respectively, having the opposing upturned ends 27', 27', 28', 28', 29', 29', and 30', 30', through aligned bearings of which the bearing rods 31, 31, 31, 31, respectively, pass. These rods are secured at one end by the lock nuts 32, 32, 32, 32 and at their other ends have the respective heads 33, and interposed between each head and the opposing upwardly turned end of the corresponding band, and surrounding said rod is the coil push spring 34. The numeral 35 designates an angular slidably mounted shift bar which is longitudinally movable in a suitable track provided in the cover 2. This shift bar has the lateral webs 36, 36 provided with opposing notches 37, 37 whose sides diverge outwardly, as shown in Figure 3. The upwardly turned ends of the respective bands 27, 28, 29 and 30 carry the respective rollers 38, 38 which ride on the webs 36 and are disposed to drop into the notches 37 when in alignment therewith. The rear end of the bar 35 is connected to a shift rod 39 which works in a long bearing 40 and has an annular rib 41, and interposed between this rib and the opposing abutment 42 of the casing and surrounding the rod 39 there is a coil push spring 43. A yoke 44 connects the rear end of the rod 39 with the rear end of the pedal rod 45, and the forward end of this last mentioned rod is connected to the pedal bar 46 which is slidable on the track 47 of the cover 1, and to which the pedal 48 is secured. The bar 35 may be locked against movement by means of the lock pin 49 which is carried by the free end of the arm 50, and which is adapted to be projected into the socket 51 in the upper side of said bar. The arm 50 is formed integrally with the lower end of an upstanding lever 52 and which is provided with the usual rack and dog arrangement 53. When the lever 52 is shifted into one position the lock pin 49 is withdrawn from the socket 51 and the shift bar is permitted to operate and when said lever is shifted into the other position the lock pin 49 engages in said socket and locks said bar against movement. The bar is shown in locked position in Figure 3, in which position all of the bands 27, 28, 29 and 30 are held in released position by means of the fact that the rollers 38 are out of the notches 37, being held in said position by the webs 36. The driven member 6 has a spur gear wheel 54 fixed to the inner end thereof and enclosed by the casing 1. Journaled into this gear there is a central shaft 55 which has the small spur gear 56 fixed thereon, and the inner end of this shaft is formed with a bevel gear wheel 57 in mesh with the reverse gears 12, and the inner end of the driving member is reduced and journaled into the shaft 55 forming a bearing 58 for said last mentioned shaft.

In the lower part of the transmission case there is a short shaft 59 rotatably mounted in suitable bearings on which the large spur gear 60 is splined, said spur gear being formed with an extended sleeve 61 which is formed with a gear face in mesh with the gear 54. Splined on the shaft 59 on the opposite side of the gear 60 from the sleeve 61 there is a small spur gear 62. There is a reverse gear wheel 63 mounted on the shaft 64 and in mesh with the gears 56 and 60 and transmitting rotation from the former to the latter, but in a reverse direction.

The numeral 63' designates a bevel gear wheel in mesh, both with the low and the intermediate gear wheels 13 and 14. This gear wheel 63 is formed with a sleeve 64 forming a bearing on the shaft 55, and the extended end of this sleeve has a spur gear face 65 which is in mesh with the gear 60. There is a high speed bevel gear 66 in mesh with the gears 15 and formed with a sleeve 67 which runs on the sleeve 64 as a bearing whose extended end is formed with a gear face 68 in mesh with the high speed gear 62. The sleeve 67 runs in a suitable bearing 69 formed with the transmission casing.

When it is desired to reverse the transmission the pedal 48 is moved forwardly until the notches 37 are brought opposite the rollers carried by the band 27 and these rollers will drop into said notches and said band will be caused to grip the drum 16, by the corresponding spring 34, and said drum and the gear 18 carried thereby will be held against rotation. As the driving member 5 continues to rotate the gear frame carried thereby will also rotate causing the reverse gears 12 to turn and imparting rotation through them to the gear 57. This will rotate the shaft 55 and the spur gear 56 carried thereby, and said rotation will be imparted through a reverse gear 63 to the gear 60, and thence through the gear 61 to the gear 54, and to the driven shaft 6. In order to obtain first speed ahead the pedal 48 is released and the bar 35 will be moved by the spring 43 until the notches 37 align successively with the rollers 38 of the brake bands 29 and 30 respectively. When these notches 37 align with the rollers of the band 28 said band will be released to the influence of the corresponding spring 34 and will grip the drum 19 and hold it against rotation, and as the driving member 5 continues to rotate the low speed gears 13 will be rotated by the gear 21 of said drum and this rotation will be transmitted to the bevel gear wheel 63', and through it to the gear 65 which is in mesh with and rotates the gear 60 and through this last mentioned gear rotation is imparted to the driven shaft 6 through the gears 61 and 54. Second speed ahead is obtained when the rollers 38 of the band 29 drop into said notches, and high speed ahead is obtained when the rollers 38 of the band 30 drop into said notches. In this latter case the drum 25 is held against rotation and the gear frame rotates. With the driving member rotation will be imparted to the high speed gears 15 to the gears 26 and in turn will impart rotation to the gear 66 and to the gear 68 carried by the sleeve thereof and through this latter gear to the gear 62 and the shaft 59 thence to the driven member 6 through the gears 61 and 54. When in reverse or first or second speed ahead the shift bar must be held in position by the foot pedal 48, but for high speed ahead this is not necessary inasmuch as the spring 43 will have reached the limit of its influence when the notches 37 register with the rollers 38 of the band 30.

When this type of transmission is employed no clutch will be necessary inasmuch as there is no shifting of gears, the transmission may be readily changed from any speed to any other speed or to reverse by the simple manipulation of the foot pedal 48 and may be locked in neutral or disengaged from operation by the simple operation of the manual lever 52.

What I claim is:—

1. A transmission mechanism including a driving member, a driven member, a gear frame fixed to one of said members and including radial bearing pins and a band secured to said pins, a plurality of trains of normally idle gears connected to one of said members, the gears of each train being constantly in mesh and one gear of each train being mounted on one of said pins and means through which a selected gear of each train may be alternatively held against rotation, relative to the other member, and driving connection thereby established between said members, said means including brake mechanisms, and a shiftable bar, under the control of the operator, for controlling said mechanisms.

2. A transmission mechanism including a driving member, a driven member, a gear frame fixed to and rotatable with one of said members and including radial bearings, annular gears mounted to rotate independent of said member, transmitting gears mounted to rotate on said bearings in mesh with said annular gears and in operative connection with the other member, brakes for holding said annular gears alternatively against rotation, a shiftable member, under the control of the operator for releasing said brakes, said member being formed to permit the operation of the brakes alternatively.

3. A transmission mechanism including a driving member, a driven member and including radial bearing pins and an annular band, a gear frame fixed to and rotatable with one of said members, independent drums mounted to rotate independent of said member and formed with gear faces, transmission gears mounted to rotate in said frame on said pins and in mesh with the gear faces of said drums and also in operative connection with the other member, brake bands surrounding the respective drums, and means for manipulating the bands through which the drums may be alternatively locked against rotation, said means including yieldable members normally tending to set said bands, and a shiftable bar formed to hold said bands in inactive position, when the bar is in one position, and to permit the successive setting of said bands when the bar is shifted to other positions.

In testimony whereof I have signed my name to this specification.

NICK G. CEDILLO.